US006609674B2

(12) United States Patent
Gabrys (10) Patent No.: US 6,609,674 B2
(45) Date of Patent: Aug. 26, 2003

(54) HIGH-SPEED MANUFACTURING METHOD FOR COMPOSITE FLYWHEELS

(75) Inventor: Christopher W. Gabrys, Reno, NV (US)

(73) Assignee: Toray Composites (America), Inc., Tacoma, WA (US)

(*) Notice: Subject to any disclaimer, the term of this patent is extended or adjusted under 35 U.S.C. 154(b) by 190 days.

(21) Appl. No.: 09/951,844

(22) Filed: Sep. 11, 2001

(65) Prior Publication Data

US 2002/0056782 A1 May 16, 2002

Related U.S. Application Data (60) Provisional application No. 60/231,653, filed on Sep. 11, 2000.

(51) Int. Cl.[7] ................................................. B21F 3/04
(52) U.S. Cl. ....................... 242/437.3; 74/572; 156/175
(58) Field of Search ........................... 242/437.3, 437.4; 29/894; 74/572; 156/175

(56) References Cited

U.S. PATENT DOCUMENTS

| | | | | |
|---|---|---|---|---|
| 4,660,435 A | * | 4/1987 | Davis et al. ................... | 74/572 |
| 5,590,569 A | * | 1/1997 | Nardone et al. ............... | 74/572 |
| 5,778,735 A | * | 7/1998 | Groves et al. ................. | 74/572 |
| 5,778,736 A | * | 7/1998 | Maass et al. .................. | 74/572 |
| 5,784,926 A | * | 7/1998 | Maass ........................... | 74/572 |
| 6,029,350 A | * | 2/2000 | Maass et al. .................. | 29/894 |

OTHER PUBLICATIONS

Gabrys and Bakis "Filament Winding of Thick Composite Rings with High Radial Accretion Rates" Proc. Intl. Expo '98, Soc. Patics Industry, New York, 1998, pp. 17.1-1–17A.8.

McKnight, G.P. and Bakis, C.E. "In–situ Gel Monitoring of Filament wound Composites with Low Cost DC Resistance Sensors" 1996.

Gabrys, C.W. and Bakis, C.E. "Fabrication of Thick Filament Wound Carbon Epoxy Rings Using in–situ Curing: Manufacturing and Quality" Proc. American Society for composites, 9th Technical conf., Technomic, Lancaster, PA, 1994, pp. 1090–1097.

* cited by examiner

Primary Examiner—Emmanuel Marcelo
(74) Attorney, Agent, or Firm—J. Michael Neary (57) ABSTRACT

An in-situ curing filament winding process for making high quality flywheel rims at low cost, and the rims made by the process, and also an apparatus for performing the process, continuously cures resin during the filament winding process. A lower winding process temperature is used along with a lower cure temperature and inherently higher toughness epoxy resin system allows for the rim to be wound continuously, using a conservative radial deposition rate of approximately ¼–½ inch per hour. Multiple types of fibers can be used in a rim where they best serve the strength and stiffness requirements of the structure. The winding temperature can be kept at approximately 55° C.–80° C., providing low thermal residual stresses. Aliphatic amine or ether amine curing agents with epoxy resin generally work well to reduce the winding temperature and allow low viscosity, but other resin systems that provide similar characteristics can be used.

36 Claims, 8 Drawing Sheets

HIGH-SPEED MANUFACTURING METHOD FOR COMPOSITE FLYWHEELS

This relates to U.S. Provisional Application 60/231,653 filed on Sep. 11, 2000. This invention pertains to a process and apparatus for manufacturing composite flywheel rims and to the flywheel rims made by the process and apparatus, more particularly to a production in-situ curing filament winding process for manufacturing composite flywheel rims at low cost.

BACKGROUND OF THE INVENTION

Flywheel systems have been used for many years for storing energy in a system, and then releasing that stored energy back into the system when it is needed. Flywheel systems also provide a smoothing effect to the operation of internal combustion engines and other kinds of power equipment. More recently, flywheel systems are being used in electrical applications for uninterruptible power supplies (UPS) by storing and releasing energy. Flywheel energy storage systems (FESSs), which include a flywheel rotor and an attached motor/generator, convert electrical energy to mechanical energy by using the motor to accelerate the flywheel rotor to rotate at high speed. The energy is stored kinetically in the motion of the flywheel rotor. Mechanical energy is then later converted back to electrical energy when required by using the rotational inertia of the spinning flywheel rotor to drive the generator. Using FESSs instead of conventional electrochemical batteries for electrical energy storage offers the advantages of potential higher reliability, longer life and much higher power capability if desired.

Flywheel rotors constructed of steel were used in flywheel UPS system due to simplicity in early days, however the performance of such flywheels is low with tip speeds typically limited to around 400 m/sec or less. In comparison, a flywheel rotor having a composite flywheel rim can be operated at much higher speeds (700–1000 m/sec). The higher performance is the result of the increased strength to weight ratio by applying and tailoring high strength glass and carbon fibers in flywheel rims. Because the energy stored for a given flywheel design is proportional to the square of the tip speed but is only linearly proportional to the mass of the flywheel rotor (rim and hub), researchers have fervently pursued the much the higher speed composite flywheel rims.

To be competitive in the power quality and power reliability industry, flywheel based UPS systems must compete against conventional electrochemical battery based UPS systems which has low reliability and life, but has low cost. To compete effectively, high performance composite flywheel rims must be manufactured at a high rate and low cost. Among the many composite part fabrication methods, it is generally accepted that filament winding offers the greatest potential for composite flywheel rims. Filament winding can be a highly automated process that is capable of high material deposition rate and very high part quality, which is inherently needed for highly stressed flywheel rims. Filament wound flywheel rims are typically designed as thick, predominately hoop-wound composite rings that can be spun to very high speeds and are hence very effective for energy storage. Wet filament winding, where a thermoset resin is impregnated into the raw fibers during the filament winding operation, is the preferred fabrication method for a composite rim. Composite quality for very thick structures such as flywheel rims has also been shown to be much higher (lower void content and better fiber alignment) by wet winding than by filament winding using prepreg (previously impregnated and partially gelled) tows. The higher quality is the result of the much lower viscosity of wet winding resins allowing for entrapped air to be squeezed out of the part as the fiber is laid onto the part, as opposed to high viscosity prepreg resin that is not designed flow as freely during the winding process.

Filament winding of thick parts has been done by winding the part in stages, or staged winding, in which the part is wound in annular layers having a radial thickness of less than about ¾ inch, which layers are successively cured. Subsequent layers are wound and cured repeatedly on top to allow fabrication of parts several inches thick. Staged winding has been done for several reasons that include; production of straight fiber alignment and the prevention of excessive heat generation during exothermic resin reaction that could damage the part. Producing straight fiber alignment, or the lack thereof which is know as fiber buckling, can be explained as follows. During filament winding, fibers are initially wound onto the mandrel with some amount of tension. Successive layers are wound on top, each increasing the part thickness and also inherently adding some compression to the layers below. As a part becomes greater than about ½ inch thick, the combined superposed compression of all of the outer layers causes the inner layers to loose tension and they actually go into compression. Because of the extremely small diameters of the individual carbon or glass fibers (5–20 $\mu$m), the fibers easily buckle under compression and this buckling spreads radially outward forming an unacceptable kinkband in the cured composite. The buckled or wavy fibers reduce the hoop strength of the structure and would hence reduce the maximum speed and energy storage capability of a flywheel rim.

Besides allowing for straight fiber alignment in thick filament wound parts, staged winding has also been done to prevent excessive exothermic reaction of the resin during curing. If parts were cured at one time with thickness greater than about ½ inch, the heat generated in the part center becomes excessively high due to reaction of a large amount of resin all at once, and the inability for heat to quickly disperse due to the poor thermal conductivity. Staged winding has allowed for fabrication of high quality thick filament wound parts.

The problem with staged winding is that the process is extremely time-consuming and costly. In many cases, a filament wound composite flywheel rim has a radial thickness of as much as 6 inches. Such flywheel rims would need to be wound and cured in 12 separate stages taking approximately 12 days in the case of stage winding. Further increasing the manufacturing time is the staged winding requirement to wrap the rim with porous release tape after winding each stage to improve adhesion with the next stage to be wound after curing. The tape is removed and the rim is sanded and coated with wet resin prior to winding the next stage. Considering that the expenses for equipment use time are one of the largest composite fabrication costs in many cases, staged winding would appear to be an undesirable method for composite flywheel rim fabrication.

In-situ curing filament winding is a relatively new process that allows for fabrication of very thick filament wound parts in less time by curing the part progressively and continuously while it is being filament wound, thereby reducing the manufacturing time and cost. In-situ curing has been the subject of experimental projects but is still in its infancy and heretofore has not been developed to the degree in which it could be considered to be a robust, reliable, repeatable industrial process.

Some researchers have pursued flywheel fabrication methods by filament winding with thermoplastic prepreg with in-situ consolidation by addition of very high heat (>200° C.) at the point of fiber contact with the rim. However, using a thermoplastic matrix further exacerbates the problems with using prepregs by having an even higher raw material cost and also a very slow manufacturing rate due to the much more high resin viscosity that slows consolidation. The cooling of flywheel rim from the high manufacturing temperature also causes unacceptably high thermal residual stresses.

SUMMARY OF THE INVENTION

Accordingly, this invention provides an improved in-situ curing filament winding process for making high quality flywheel rims at low cost and the rims made by the process, and also includes an apparatus for performing the process. The method uses in-situ curing to continuously cure the resin during the filament winding process. A lower winding process temperature is used along with a lower cure temperature and inherently higher toughness epoxy resin system allows for the rim to be wound continuously. Multiple types of fibers can be used in a rim where they best serve the strength and stiffness requirements of the structure. Press-fit assembly of rims containing both glass and carbon fibers is no longer required as they can be wound together without causing the rim to crack under thermal stress. This is accomplished by using relatively low cure temperature epoxy along with simultaneously using a conservative radial deposition rate of approximately ¼–½ inch per hour. The winding temperature can be kept at approximately 60° C.–80° C., providing low thermal residual stresses. Aliphatic amine or ether amine curing agents with epoxy resin generally work well to reduce the winding temperature and allow low viscosity, but other resin systems that provide similar characteristics can be used.

DESCRIPTION OF THE PREFERRED EMBODIMENT

In the process of filament winding with in-situ curing according to this invention, the part being made is heated to a certain winding temperature as the resin-impregnated fibers are being wound on to it. The winding temperature is determined by the desired rate of material deposition on the part and the reactivity of the selected resin. The process is based on the fact that thermoset resins have a temperature dependent gel time, defined as the time that they take to gel or harden at that temperature. Within certain limits, the gel time of thermoset resins decreases with increasing temperature. An approximate rule of thumb for epoxy resins used for the composite flywheel rims of this invention, is that the gel time is reduced in half for every 10° C. temperature increase. The winding temperature (the part surface temperature during winding) and winding rate are determined so that the resin gels or hardens to hold the fibers in place before the part becomes too thick and the fibers have a chance to buckle. Preferably, the process parameters, described below, are chosen to ensure that the thickness of the ungelled part does not exceed about ½–¾ inch at the outer surface of the part before the resin gels. As the part is continuously wound at a certain winding rate to a thickness of several inches, the resin continuously gels radially outward at the same rate, thereby maintaining a shallow radial zone of gelling material below the wet part surface.

A temperature controller 35a and heater 35 maintains a constant part temperature to maintain the desired curing rate. Because the resin cures in a continuously progressing thin layer as the part is being wound and because the temperature controller keeps the temperature constant, exothermic overheating inside the composite is prevented. The part can be heated by internal mandrel heaters, an external box oven convection heater and/or by infrared heaters 35 aimed at the part surface. The part temperature is measured using an infrared temperature sensor 36 aimed at the surface of the part. Because the material deposition rate onto a part is typically only around ¼–1 inch radially per hour even at high rate manufacturing, the difference between the rim surface temperature and the temperature below the surface in the gelling zone is small and insignificant.

After winding is completed, the part is rotated and heated for at least about 1 additional hour on the winder so that the outer layer gels completely. The part can then be moved to an oven and post cured for several hours at moderate temperature, if it would improve the mechanical properties of the particular resin.

In-situ curing produces even higher quality composite rims than conventional staged winding. The elevated part temperature during winding significantly reduces the void content in the rim because the resin viscosity is drastically reduced (usually less than 100 cps) on the composite surface as the fiber is being laid down. Air bubbles readily escape instead of being trapped in the cured composite. Void contents as measured by ASTM D2584 are reduced from typical 3–4% to less than 2%, or even less than 1%. The lower resin viscosity on the part surface make it possible to increase fiber volume fraction to more than 60%, as measured by ASTM 792, and facilitates more automated filament winding manufacturing. In conventional filament winding where parts are wound at room temperature, a technician is required to scrape the excess resin periodically from the part surface with a squeegee. This resin becomes even thicker than usual (several thousand cps) due to trapped air from the fiber continuously being laid down. With the in-situ winding process, on the other hand, the resin viscosity on the heated part surface remains low and excess resin automatically drips from the part, which decreases the resin volume fraction and minimizes another process variable.

In-situ curing filament winding also enhances the part quality by allowing a level of straight fiber alignment that was previously unachievable with conventional staged winding. The better fiber alignment is a result of curing the part in a continuous process. The ungelled thickness on the part surface can be controlled by the winding rate and by the winding temperature. This allows the part to cure before even ½ inch of ungelled composite is wound on top. Likewise, an in-situ cured part is more uniform and does not contain any resin rich layers that typically form between successively cured layers in a staged wound part.

To ensure that the resin viscosity remains low enough during in-situ curing winding fabrication of a large part that typically can last hours, an cyclo aliphatic amine cured Bisphenol A resin was selected having an extremely long pot life even at elevated resin bath temperatures of up to 65° C. The long pot life contributes to prevent resin from curing in the resin bath while winding, and the low resin viscosity is preferred to allow the high tow speeds without breaking fibers. Other resins may be employed for the benefits of either reducing the manufacturing time by curing quicker (ether amine cured Bisphenol A) or for changing the stress distributions by imparting extreme flexibility (such as polyurethane). With in-situ curing, a suitable radial deposition rate for winding the composite is approximately ¼–¾ inch per hour. With the desired ungelled composite thickness also set at ¼–¾ inch to prevent fiber buckling, the winding temperature is then set to allow a gel time of 1 hour. More reactive resins could be used for allowing radial deposition rates of composites as high as several inches per hour at higher winding temperatures.

A lower temperature curing resin system provides a reduced thermal stress environment for the curing rim. Since the composite part will be cooled to room temperature after winding, the temperature change in a composite part cured at 120° C. is 100(=120−20)° C. whereas the temperature change in a composite part cured at 60° C. is 40(=60−20)° C. Thus, the thermal residual stresses are reduced by more than a factor of two. The use of the lower cure temperature epoxy also helps prevent rim cracking by having a much higher toughness ($K_{1C}$=1.0–2.2 MPa m$^{1/2}$ for aliphatic and ether amine cured epoxy compared with 0.6–0.7 MPa m$^{1/2}$ for aromatic amine cured epoxy). The $K_{1C}$ value of resin can be determined according to ASTM D5045. Anhydride cured epoxy is typically even more brittle. Tougheners may be added to aromatic amine cured resins but this would greatly increase the viscosity limiting manufacturing speed from tow breaking while the thermal residual stresses would still remain high. Accelerators could be added to reduce the winding temperature but the amount of accelerator needed would adversely affect mechanical properties. Likewise, higher cure temperature resins could be used at a low winding temperature by slowing the winding and radial deposition rate. However, the time required to manufacture rims would become prohibitively long as the winding time doubles for every 10° C. reduction in temperature.

To further reduce the cost per energy of complete flywheel UPS systems, it is preferable to increase to the amount of the rim energy storage per unit cost. The design of the flywheel is determined to maximize energy storage per rim, while keeping simple low cost construction. It is desirable to make flywheel rims with a significant radial thickness (ID/OD≈0.5) such that they store appreciable amounts of energy. However, such flywheel rims, whether made from all glass fibers or all carbon fibers, generate unacceptably high radial tensile stresses when rotated. Radial stresses in a given ring are inversely related to the ratio of inner diameter to outer diameter. The lower the ratio and thicker the rim, the higher the radial stresses. Because filament wound rims lack fiber reinforcement in the radial direction, they inherently have low tensile strengths in the radial direction. Therefore, single fiber composite rings are usually limited to a very thin (ID/OD≈0.8) radial dimension for maximum speed and strength utilization of the rim in the hoop and radial directions. To overcome this limitation, flywheel rims are preferably constructed using two different materials with different moduli of elasticity and densities. The usual combination is to use both glass and carbon fibers in one rim. In doing so, glass fibers having a lower modulus of elasticity and higher density, are placed at the inner diameter, and carbon fibers having a higher modulus of elasticity and lower density, are used at the outer diameter. When the flywheel rotor is spun to high speed, the inner ring tries to grow more than the outer ring due to its lower specific modulus of elasticity. The composite rim thereby generates radial compression throughout. This self-generated radial compression allows the total flywheel rim to be constructed radially much thicker (ID/OD≈0.5) and still achieve high rotation speed. The level of radial compression for a given flywheel rim design can be reduced or limited, if desired, by gradually transitioning from all glass to all carbon fiber by using some intermediate layers of varying mixtures of the fibers. This lessens the large radial compression stress that would otherwise be generated at the interface of the two fibers.

In-situ curing filament winding construction of composite flywheel rims using two or more different types of fibers for increased energy storage has encountered significant problems in development. For example, attempts to wind multiple fiber rims continuously by in-situ curing with both glass and carbon fibers have encountered cracking of the rims during manufacture. The cracking is the result of higher residual stresses impart due to the different mechanical and thermo-mechanical properties of the two different composite materials. The different coefficients of thermal expansion and elastic moduli of the fibers cause the rings to contract differently upon cooling and from the resin shrinkage during curing. A more flexible resin system such as urethane may be useful in such a rim to accommodate the slight shear that could develop between adjacent fiber tows of different mechanical and thermo-mechanical properties. The substitute method of post-assembling individually wound and cured rings is not a desirable solution. This method adds significant extra expense because the rings need to each be premachined to tight tolerances before assembly, sliding surface coated with an epoxy-bonding agent, pressed and then remachined to final dimensions.

Figure 1:
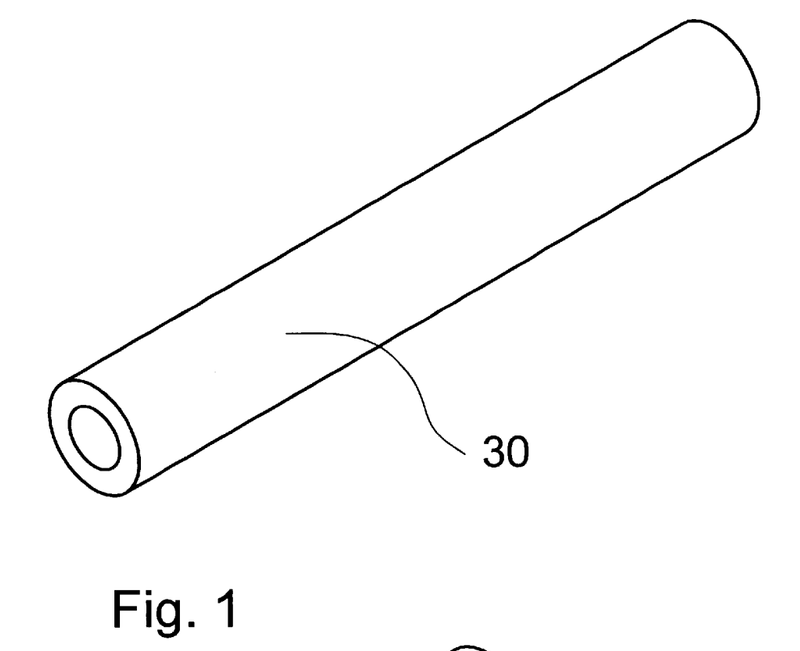
FIG. 1 is a sketch of a composite rotor log and an individual rotor cut from the log.
Figure 1A:
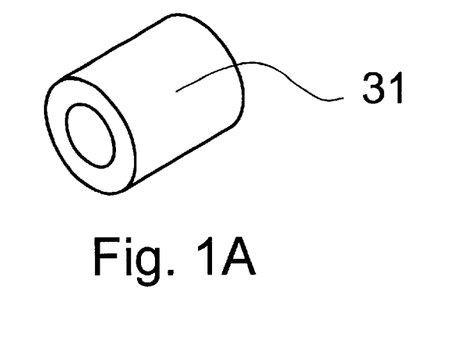

Turning to the drawings, wherein like characters designate identical or corresponding parts, FIG. 1 shows a log 30 and FIG. 1A shows an individual flywheel rim 31 that is cut from the log after winding/curing. The manufacturing time and cost per rim are minimized by winding a composite part as a long multi-rim log rather than as individual rims. After winding and post cure, the log is then cut into individual rims which are machined to tight tolerance by grinding. Because the winding rate is dependent on the maximum acceptable radial deposition rate, winding a single rim, takes about the same amount of time as winding a long log which could be cut into multiple rims, for example, a 14-foot log which could be cut into 28 rims having 6 inches in length.

To wind a long log at high speed, winding is done with multiple tows, such as 20 at one time, so that the radial deposition rate can be maintained without having excessive tow speeds. For example, a 14-foot log with a radial thickness of about 5 inches and inside diameter 10 inches can be wound with 20 fiber tows at a time in about 10 hours while limiting the tow speed to below 100 m/minute. The tow speed (line speed) is higher than conventional, but it is possible using a special winder setup as described below. An even further increase of productivity is gained by using a multiple spindles filament winder such that more than one log is wound at same time. The machining of the rims to tight tolerance is done by grinding with a diamond wheel. This is the fastest machining method and it does not risk pulling fibers from the composite. The rim is then sealed with a thin (0.001–0.01") coating of epoxy.

The rim 31 can be cut from the log 30 either by rotating the log and plunging with a rotary saw or by using a conventional bandsaw. The preferred method for simplicity is to use a carbide-tipped blade on a bandsaw.

Figure 3:
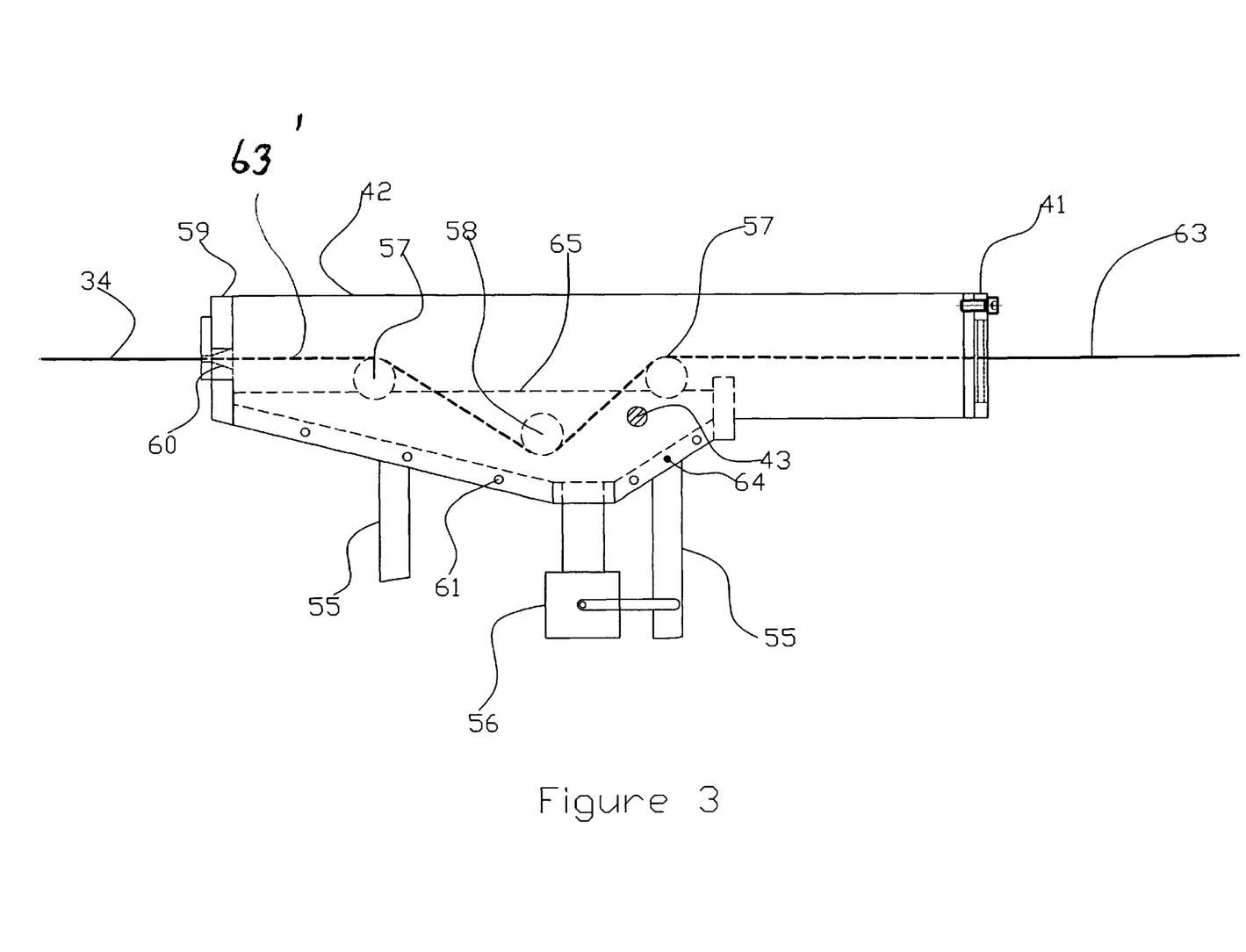
FIG. 3 is a sketch of preferred resin bath in the apparatus shown in FIG. 2.

In order to wind a log for preferably short hours with low cure temperature/highly reactive resin, special techniques are needed. Those techniques focus on preventing down time during the wind. Because the resin impregnated in fiber tow is continuously cured on the winder, stops in the winding process should be kept to a minimum and preferably below 10 minutes at any one time of stop. One of the biggest causes of down time in filament winding is fiber tow breakage. This invention uses several techniques to reduce tow breakage to commercially insignificant rates. In many filament winding operations, tow breaks occur at the resin bath because of the high viscosity of the resin and the mechanical bending of the filaments to promote resin impregnation. To reduce tow breaking, this invention uses an extremely small resin bath 42, typically about 0.15 liter/tow of resin in the bath are kept at a time. Amount of resin in resin baths for conventional filament winding operation is much more than 1.5 liters/tow. The small bath size of this invention ensures that all of the resin in the bath will be quickly used up by the fibers passing through and must be quickly refreshed. Because the fresh resin usually stays in the bath for only 5–10 minutes, the resin bath can be heated much hotter than the case of conventional filament winding without the risk of premature gelling. The higher resin temperature drastically reduces the resin viscosity, which greatly reduces tow breaking. The small bath also allows the use of the low temperature resins that would otherwise quickly setup in a large resin bath. The bath is heated with removable electric cartridge heaters for much faster response than conventional water jackets so the reactive resin is also more easily controlled. Other features of the resin bath 42 include fixed (non-rotating) spindles 57 and 58. Fixed spindles, instead of rotating spindles, are used in the bath for reducing tow breaking by two ways. The fixed spindles prevent fibers from winding up around them and breaking an individual and multiple tows. The fixed spindles also do not churn air into the resin, which increases viscosity. Resin viscosity in the bath, using appropriate aliphatic or ether amine cured Bisphenol A epoxies, can be maintained extremely low, under 300 cps and in some cases below 100 cps.

The most significant cause of downtime during filament winding is the time to recover broken fiber tows. The tension system in the inventive apparatus contributes to significantly reduce the tow breaking. The tension applied to the fibers at the creel is much lower (1–4 lbs) than conventional values of 5–6 lbs/tow. This reduces the damage caused to the fibers in the resin bath and also the tow breaking. The tension is increased to some extent in the bath by the use of the fixed spindles and more tension is safely added later by the payout system that dispenses the already impregnated fiber to the mandrel. To allow for metering of the resin into the fiber tows, the resin bath 42 uses fixed orifices 60 in a holder 59, shown in FIG. 4, instead of a rubber squeegee, which is used usually pressed against the fibers. This has several advantages including greatly reducing tow breaking because there is no direct pressure on the fibers, the wet fiber volume fraction can be metered much closer (55% compared to 30%) and the amount of resin in the impregnated tows is not a function of the tow speed. No operator adjustment is needed either and the orifices do not wear out. This resin bath is also better than the other conventional type of baths, drum baths, because it does not churn the resin increasing viscosity and has accurate and repeatable metering. The result of these setup changes is the capability to wind parts with tow breaks limited to as little as 1 tow break per 100 spools.

Figure 2:
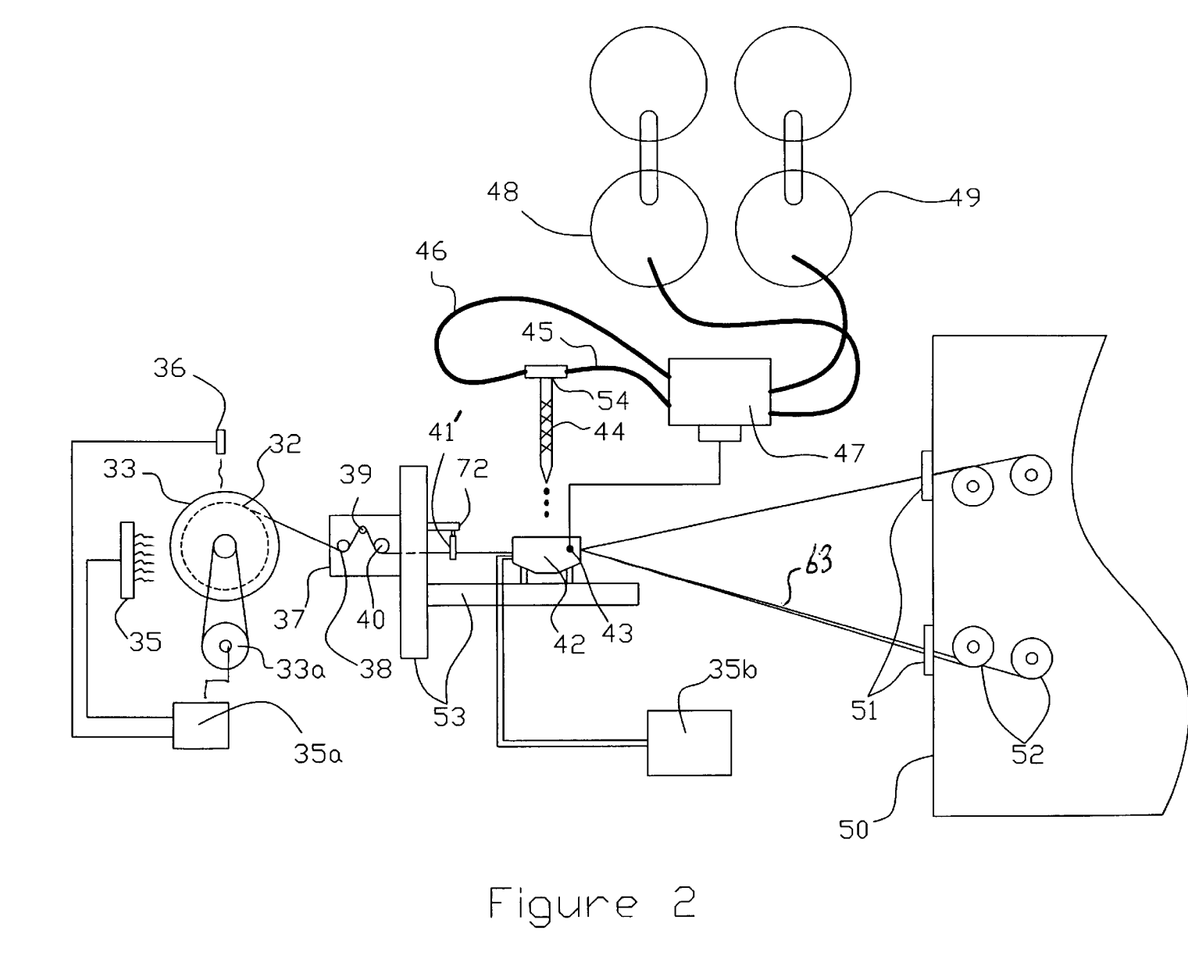
FIG. 2 is a sketch of preferred filament winding apparatus.

Because the resin in the bath needs to be completely replaced every few minutes, a resin level sensor 43 is attached to the resin bath and it signals an automating resin meter-mix pump. Resin and hardener are pumped from drums 48 and 49 (usually 55 gallon) separately to a mixer manifold on the winder. A disposable plastic static mixer tube 44 attached to the manifold 54 mixes the combination and dispenses the mixed resin into the bath. There are two drums of resin 48 and hardener 49 in stacked arrangement such that the top drums drain into the bottom ones which are pumped. This allows continuous operation because the top drums can be replaced without stopping and resin and hardener never run out.

Figure 5:
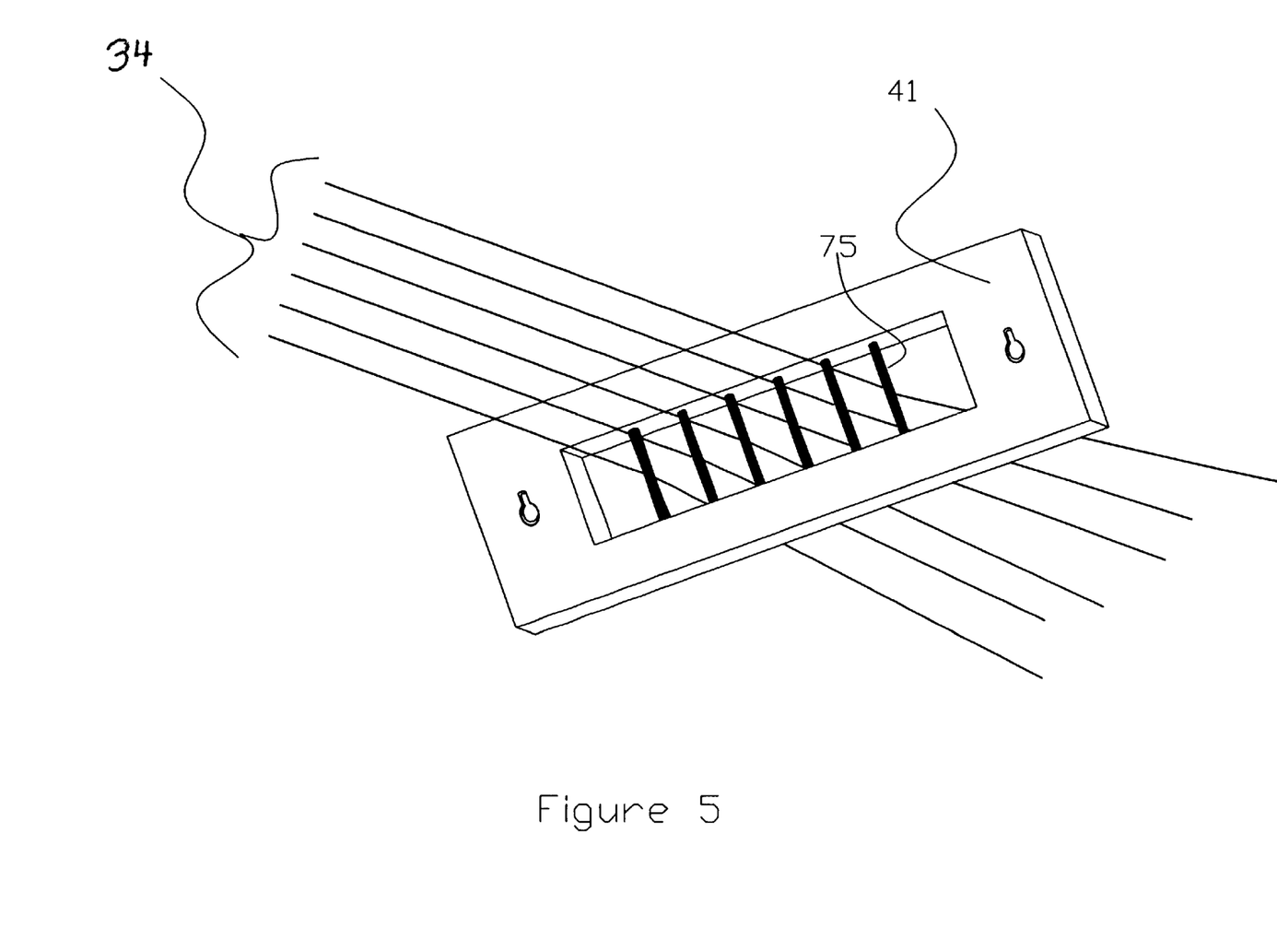
FIG. 5 is a sketch of a preferred "quick-change" fiber comb used in the apparatus shown in FIG. 2.

Another cause of downtime during filament winding is the time required to change tows between one fiber type to another or between one set of spools being emptied and another set being started. With multiple tows more than 10 at a time for each spindle of the winder, down time during winding with a conventional setup is long, sometimes up to 1 hour. This down time is disadvantageous as it would cause a resin layer to cure into the part at every tow change and it would significantly increase the manufacturing time and possibly be deleterious to rim performance. For example, a single 14 ft log above described can have more than eight tow changes with over 160 spools of fiber (6 kg/spool). This invention uses "quick-change" components in the fiber path along with a special fiber payout system to reduce the time for changing fibers no matter how many tows to only 1–2 minutes. The "quick-change" system has a fiber string-up jig 73, shown in FIG. 7, for temporarily mounting holders 59 for the orifices 60 and the two fiber combs 41 and 41'. After stringing the fiber tows through the orifices and the combs 41 and 41', they are ready to be easily replaced to the resin bath. The fiber combs 41 and 41' are closed on all sides as shown in FIG. 5, and are easily replaceable. Unlike conventional combs on filament winders that are open usually on the topside to facilitate fiber placement, these combs 41 and 41' are closed on all sides so that fibers cannot lose their position after string up. The two fiber combs 41, 41' and one orifice holder 59 are placed in the fiber string-up jig 73 and the fibers are threaded through easily in accurate position. This is done prior to winding and the fibers for the next set in the wind are also strung up on another set of combs 41, 41' and orifice holder 59 while the current set is winding. A knot ties all of the fibers together once strung up. Therefore, when it is time to change tows, the combs 41, 41' and orifice holder 59 are changed in the order of a few minutes, even with 20 or more tows. The center spindle 58 in the resin bath 42 is spring loaded and removable for quick stringing through the resin bath 42. The fiber is then pulled through the payout 37, the knot of dry fiber tows is cut off, fiber tows are tied onto the part and the wind is continued.

Figure 6:
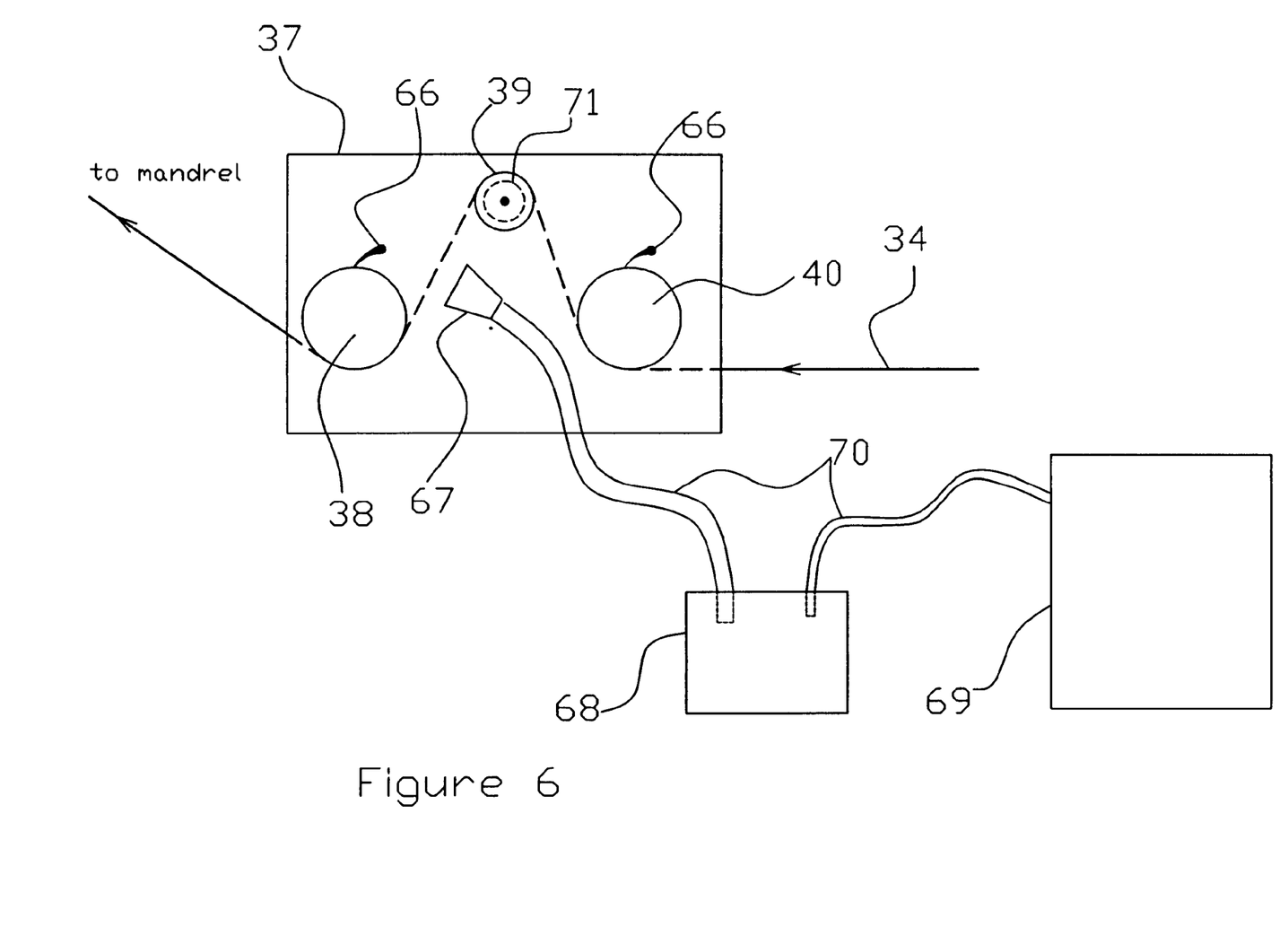
FIG. 6 is a sketch of a preferred fiber payout system used in the apparatus shown in FIG. 2.

The payout system 37, shown in FIG. 6, facilitates this quick change with a cantilever design of the rollers 38–40. All of the rollers 38–40 are supported at one end only so running the fibers through the payout takes only a few seconds. The payout system 37 is designed to reduce tow breaking. The first roller 40 is a braked roller which uses a magnetic particle brake to add extra tension to the fibers that would normally have been applied at the creel. The second roller 39 is a load cell that measures the fiber tension and it also has a notch groove that stabilizes the bandwidth of the fibers. The last roller 38 dispenses the fiber to the part. Because the first 40 and last rollers 38 rotate, fiber wind up is possible which can break many tows at one time. To prevent fiber wind-up, novel spring loaded scrapers 66 rest against the rollers 38 and 40 and stop any incipient windup. A second comb 41' is also used before the payout system to initially set the bandwidth of the fibers. The angle of this comb is controlled and set by a motorized positioner 72. By setting the bandwidth initially with the comb, the damage to the fibers passing over the grooved load cell roller is greatly reduced.

A problem in prior art processes for making filament wound parts is contamination of the part with fiber fuzz balls. These fuzz balls, which are more prevalent when winding with carbon fiber, develop on friction points along the fiber path. The fuzz balls grow and are randomly carried to the part by the passing fiber tows. Typically, a technician is assigned to watch for them and to stop the wind and remove it from the part surface before the next layer is wound on top. At 100 m/minute tow speeds and use of several hundred pounds of fiber per hour, catching fuzz balls and stopping the winder every time to remove them is impractical and labor intensive. The invention eliminates fuzz balls from the final part instead by using a vacuum nozzle 67 next to the fiber path on the payout just prior to the fiber going to the part. The vacuum nozzle 67 collects the fuzz balls in a vacuum trap 68 disposed between the nozzle 67 and a vacuum source 69.

The heating of the part during winding to the predetermined temperature of about 55° C.-100° C., preferably below 80° C., is done by preheating the mandrel to the winding temperature or slightly higher using an oven prior to winding. While winding, the part temperature is maintained by infrared heaters 35 aimed at the part. The heaters are controlled by controllers 35*a* using infrared thermocouples 36 aimed at the part.

FIG. 2 shows a sketch of an apparatus for performing the winding process. The mandrel 32 is rotated by a motor 33*a*, also controlled by the controller 35*a*, or under control of a separate controller (not shown) while the impregnated fibers 34 are dispensed from a payout system 37. The mandrel 32 preferably has sidewalls 33 which prevent the fibers 34 from rolling off the ends of the mandrel 32. The part is heated with heaters 35, such as infrared heaters aimed at the part while winding. The heaters 35 maintain the part temperature by using infrared sensors 36 aimed at the part for feedback to the controller 35*a*. The payout system 37 preferably has a brake roller 40 that applies tension to the impregnated fibers 34 using a magnetic particle brake. The tension is preferably sensed with a grooved load cell spindle 39. The spindle 39 is preferably easily changed such that different size grooves can be used for winding with different fiber types and numbers of tows. The payout has an exit payout roller 38, which preferably rotates to prevent fiber sliding and it dispenses the fiber to the mandrel 32. Prior to entering the payout system 37, the fiber passes through a comb 41'. The comb 41' is attached but easily replaceable to a motorized angle positioner 72 that sets the angle and hence rough bandwidth of the fibers 34. A traversing winder carriage 53 supports the payout 37 system and a resin bath 42 which contains a resin level sensor 43 that senses the resin level 65 and signals a controller 35*b* of an automated meter-mix resin pump 47. The pump 47 pumps resin and hardener from drums 48 and 49 (usually 55 gallon) preferably in a stacked arrangement such that the top drums can be replaced without interrupting the winding process. Temperature controlled resin and hardener hoses 45 and 46 connect between the pump 47 and a mixer manifold 54 attached to the winder carriage 53. A disposable static mixer tube 44 is attached to the manifold 54 to mix the resin and hardener and dispense it into the resin bath 42. A stationary creel 50 holds the fiber spools 52 and applies a small amount of tension. Preferably, the creel 50 applies a tension of less than 2 lbs/tow to reduce fiber breakage in the resin bath 42. The exit of the creel 50 uses horizontal and vertical exit rollers 51 to account for lateral traversing of the winder carriage 53.

The resin bath 42, FIG. 3, shown is preferably is very small, with less than 0.15 liters/tow of resin in it at any time. The bath 42 has a U or V longitudinal cross-section to eliminate a dead zone of resin. The bath 42 is mounted using easily removable legs 55. To handle the highly reactive resin in the unlikely event of a longer down time, a resin drain ball valve 56 is preferably attached to the bottom of the bath 42. The bath 42 can also be periodically drained if desired to keep the resin fresh. The bath 42 uses 2 fixed spindles 57 along with another fixed but spring loaded and removable center spindle 58. The center spindle 58 is removable to facilitate quick tow changes. The bath 42 is preferably heated with electric heaters 61 inserted or attached to the bath bottom. The temperature of the bath is measured and controlled by feedback from a thermocouple 64 also inserted into the bath bottom. Dry fiber 63 enters the bath 42 by passing through a prestrung "quick-change" fiber comb 41 having separator pins 75 made of Teflon or ceramic or having Teflon sleeves on ceramic pin for low friction on the dry fiber. The excess resin is removed from the tows using orifices 60 inserted into a "quick-change" orifice holder 59. Orifices 60 are preferably carbide wire drawing dies and strips excess resin from the fiber tows so the wet fiber volume fraction of the impregnated fiber 34 is preferably between 0.50–0.60. The resin level in the bath 65 is maintained using level sensors 43.

Figure 4:
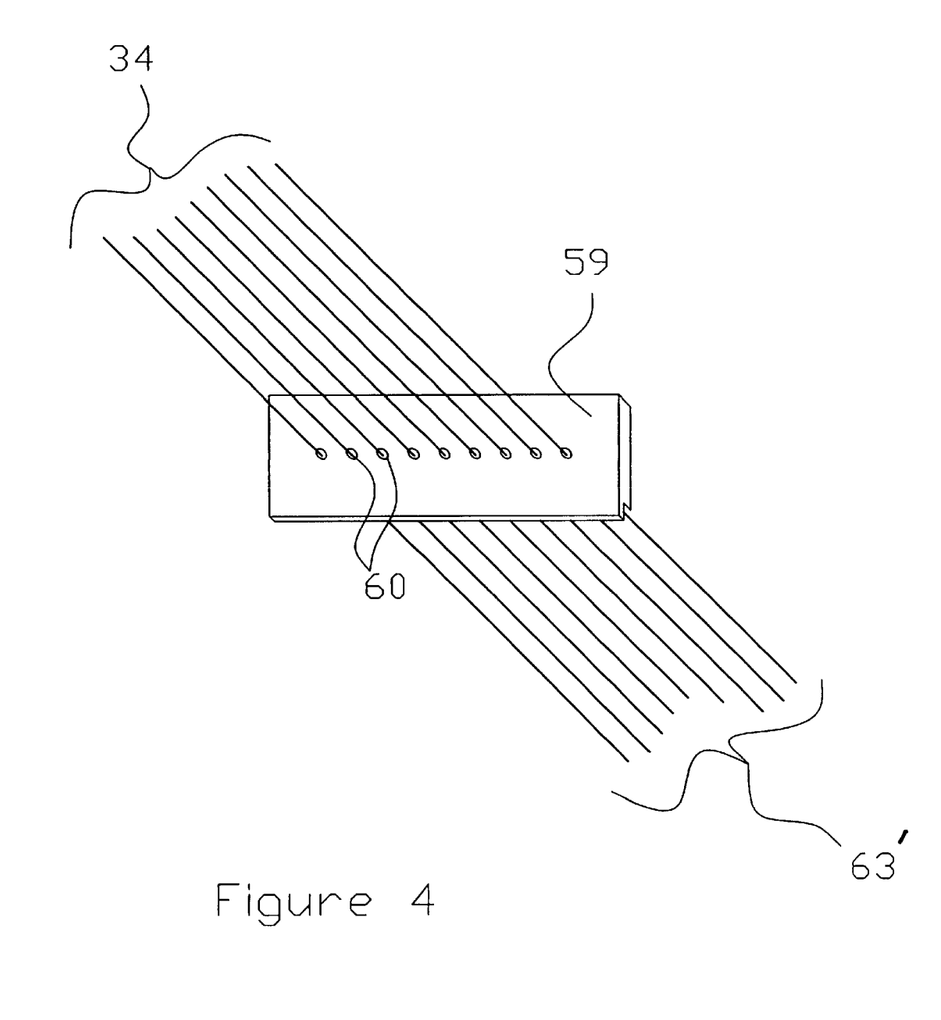
FIG. 4 is a sketch of a preferred "quick-change" orifice holder used in the apparatus of FIG. 2.

The "quick-change" orifice holder 59, shown in FIG. 4, has orifices 60 shown along with the stripped and unstripped fibers 34 and 63', respectively. A single orifice holder 59 preferably meters resin for all of the tows 34 being wound at one time per spindle. The number of tows depends on the size of log and fiber tow and it could be 20 or more for high rate winding.

A "quick-change" fiber comb 41 shown in FIG. 5 has comb pins 75, preferably equally spaced, to space the fibers. A comb 41' is used before the payout 37 to adjust the bandwidth by being rotated to a set angle. A first or inlet comb 41 is used prior to entering the resin bath 42 to order the dry fibers 63 in a parallel spaced array as they can enter the bath 42.

The payout system 37, shown in FIG. 6, has roller scraper blades 66 that are spring loaded against the payout and brake rollers 38 and 40. It is preferable that the scrapers 66 use disposable razor blades that can be replaced after each wind. The groove roller 39 for bandwidth stabilization is shown attached but easily removable from the load cell 71 that measures the tension in the impregnated fiber 34. A vacuum nozzle 67 removes fiber fuzz balls from the resin impregnated fiber 34 prior to being wound into the part. The nozzle 67 is connected to a vacuum trap 68 and then a vacuum exhauster fan 69 by vacuum hoses 70. It is preferable to keep the hoses as short and of as large a diameter as possible for increased suction.

Figure 7:
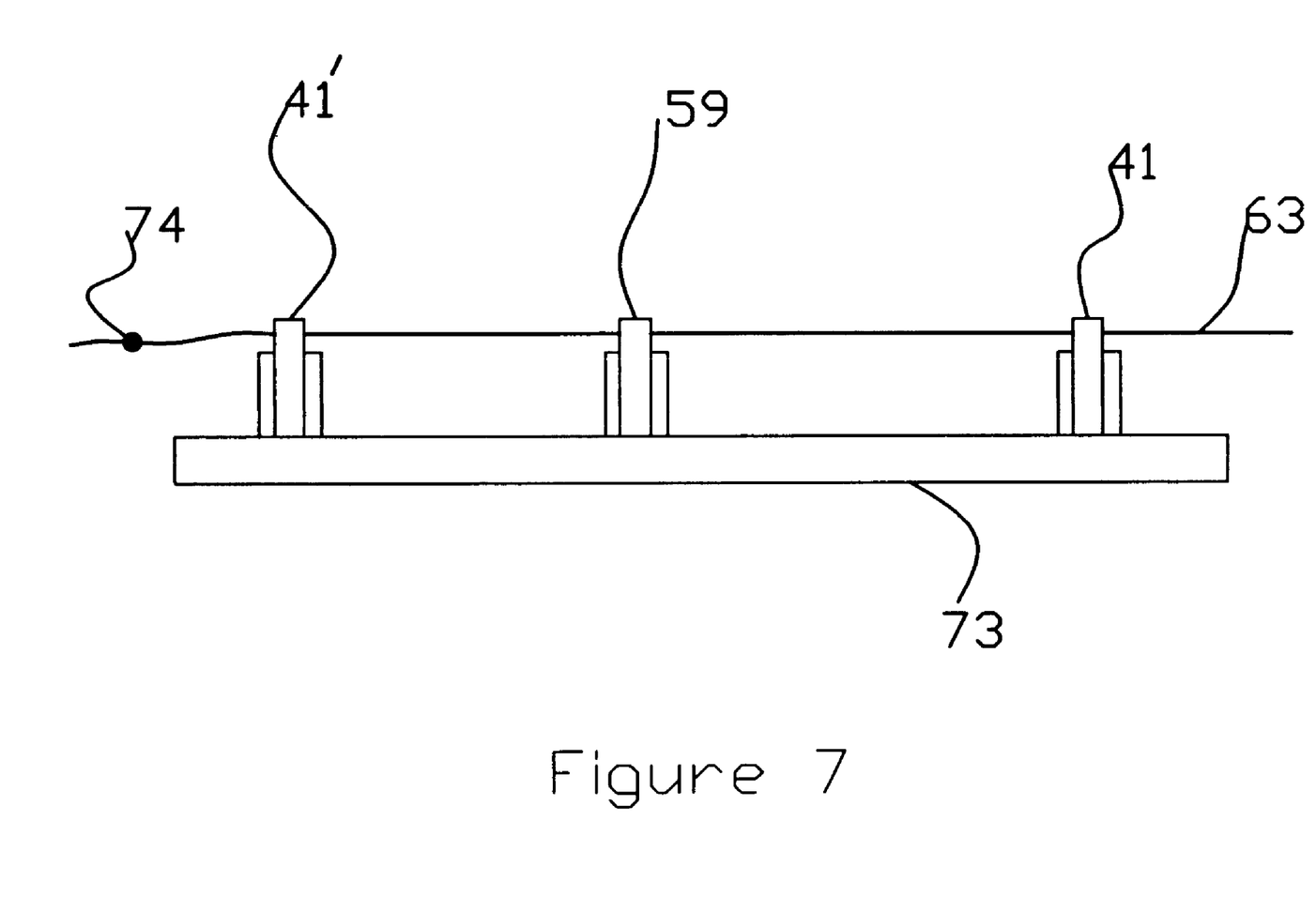
FIG. 7 is a sketch of a preferred fiber string up jig used to pre-string the fiber for use in the apparatus shown in FIG. 2.
Figure 8:
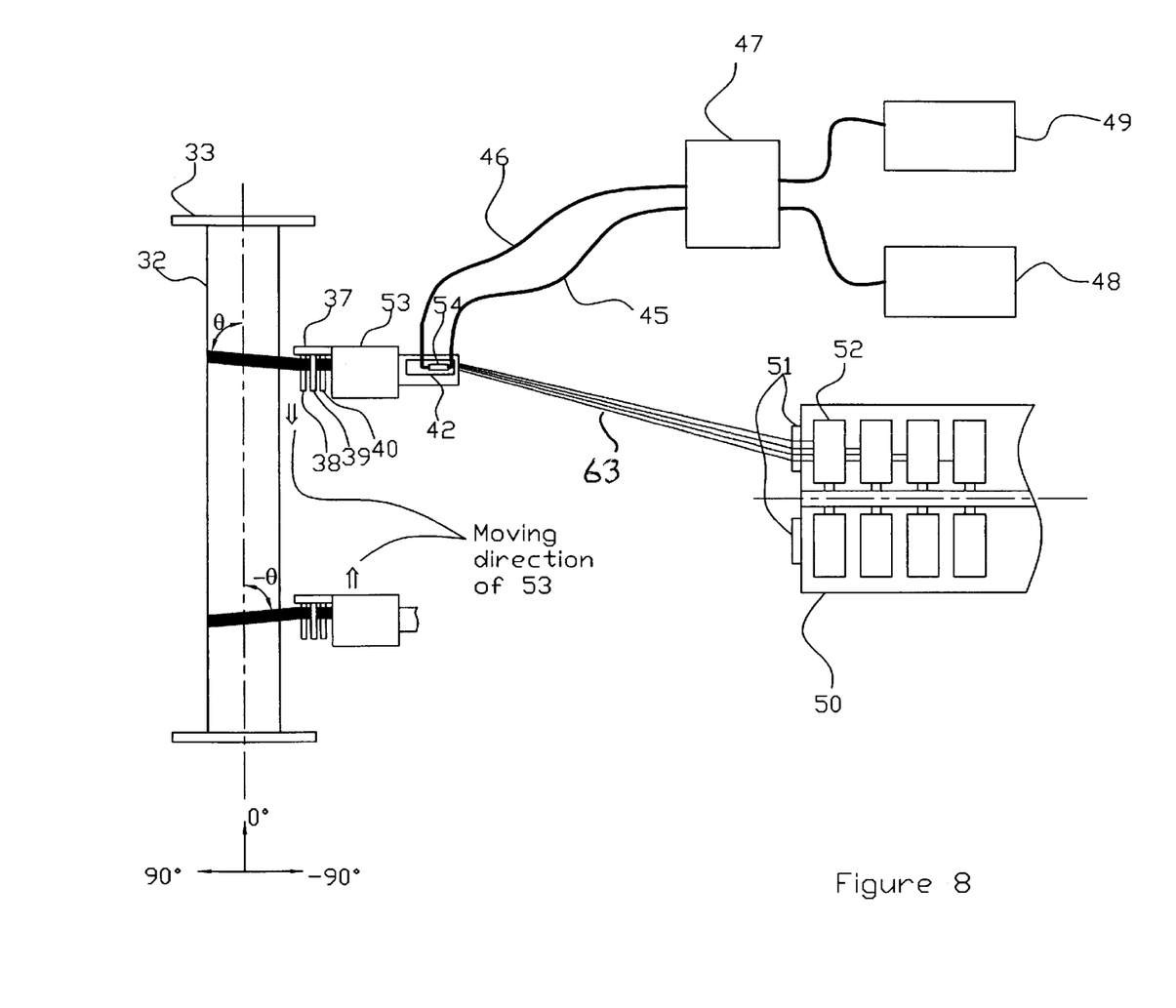
FIG. 8 is a plan view of winding set-up shown in FIG. 2.

A fiber string up jig 73, shown in FIG. 7, is used for easy and accurate stringing of the dry fibers 63 prior to use. The jig 73 holds the "quick-change" orifice holder 59 and the two "quick-change" fiber combs 41. Each can only fit into the jig 73 one-way so that improper stringing and crossed fibers are prevented.

The winding conditions including temperatures and rates for different fibers, numbers of fibers and resin systems are calculated by the equations listed below:

| | |
|---|---|
| Dry Tow Area | $DTA = Tex/100/\rho_f$ |
| | $DTA$ = dry tow area, $cm^2$ |
| | $Tex = g/1000\ m$ |
| | $\rho_f$ = Fiber Density ($g/cm3$) |
| Composite Tow Area | $CTA = DTA/V_f$ |
| | $V_f$ = fiber volume fraction in part, (0.65 typical) |
| Gel Time | $\tau_2 = \tau_1 (0.5)^{((T2-T1)/\lambda)}$ |
| | $\tau_2$ = gel time at temperature new temperature, minutes |
| | $\tau_1$ = gel time at temperature tested temperature, minutes |
| | $T2$ = new temperature, $°C$. |
| | $T1$ = tested temperature, $°C$. |
| | $\lambda$ = gel time constant, $10°\ C$. for epoxies |
| Radial Deposition Rate | $R = (60\ UGT)/\tau$ |
| | $R$ = radial deposition rate, cm/hr |
| | $UGT$ = ungelled thickness, cm |
| | $\tau$ = gel time at winding temperature, minutes |
| Mandrel RPM | $RPM = (100 \cdot R \cdot L)/(60\ CTA \cdot N)$ |
| | $RPM$ = mandrel revolutions per minute |
| | $L$ = part length, m |
| | $N$ = number of tows |
| Maximum Tow Speed | $v = \pi\ RPM \cdot Do$ |
| | $v$ = maximum toe speed, m/minute |
| | $Do$ = outer diameter of part or layer, m |
| Resin Use Rate | $Q = 100\ \pi\ N \cdot DTA \cdot Di\ (1/V_{fwet} - 1)$ |
| | $Q$ = resin use rate, $cm^3$/minute |
| | $Di$ = inner diameter of part, m |
| | $V_{fwet}$ = fiber volume fraction metered by orifice, 0.5–0.6 |
| Bath Use Time | $BUT = BS/Q$ |
| | $BUT$ = bath use time (maximum time resin is in bath), minutes |
| | $BS$ = bath size, $cm^3$ |
| Orifice Size | $OS = (4\ DTA/(\pi\ V_{fwet}))^{0.5}$ |
| | $OS$ = orifice size (diameter of hole), cm |

The dry tow area is calculated first. The wet tow area is calculated next by inputting the desired or expected final part fiber volume fraction. The resin and winding temperature must be selected. A low cure temperature resin, preferably with a gel time of less than 1 hour at temperatures of 80° C. or below can be selected. This allows for continuous winding of multiple fiber flywheel rims log without cracking if wound at temperatures of about 80° C. or below. Thinner flywheel rims have less tendency to crack than thicker ones and so do ones with more lower modulus fibers but these parameters will work with generally almost all flywheels. The gel time of the resin is measured a one temperature by preheating the resin and hardener to the test temperature in separate containers. A small amount of resin systems, less than 100 grams, is mixed and left in the oven of water bath. It is periodically checked with a stick or wire to determine the time when gelation occurs. More fancy methods can be used if necessary. The winding temperature is then determined so that the gel time is at about 60 minutes or less at the test temperature. The radial deposition rate at which composite is added to the flywheel while winding is calculated using the gel time and the ungelled thickness desired. A conservative value for this is about ¼ inch/hour to ½ inch/hour. The ungelled thickness is defined as the layer thickness of wet (ungelled) composite on the part surface while winding. It is preferable to use an ungelled thickness between ¼ inch to ½ inch for good fiber alignment and allowing longer stopping time (~10 minutes). Ungelled thicknesses of only ⅛ inch can be used for increased fiber alignment but resin layers can be easily cured into the part with only very short stop times. Longer stop times can be allowed with a thicker ungelled layer but this risks fiber buckling before curing. The mandrel rotation speed is calculated by using the desired radial deposition rate, part length, composite tow area and number of tows being wound at one time. The mandrel RPM may have to be limited due to tow speed. Tow speeds of up to 100 m/minute can be comfortably used without tow breaking using this set up. Speeds above that are possible, however the winding starts to become very messy as resin starts to be thrown off of the mandrel and in many directions. For interest sake, the resin use rate can be calculated as shown. This can be combined with the size of the resin bath to calculate the bath use time or how long the resin stays in the bath before being used up. The orifice sizes to use for metering the resin are calculated by using the dry tow area and the desired wet fiber volume fraction after the bath. A typical range of values for the wet fiber volume fraction is between 0.50 and 0.60. The fiber volume fraction in the cured part will be higher due to consolidation and resin dripping from the part while winding.

Obviously, numerous modifications and variations of the described preferred embodiment are possible and will occur to those skilled in the art in light of this disclosure of the invention. Accordingly, I intend that these modifications and variations, and the equivalents thereof, be included within the spirit and scope of the invention as defined in the following claims, wherein I claim:

What is claimed is:

1. A filament winding process for manufacturing composite flywheel rims having reinforcing fibers embedded in a thermoset resin matrix, comprising:
   impregnating said fibers with said resin;
   winding said resin-impregnated fibers on a mandrel to produce a cylindrical part having an outer part surface;
   gelling said resin in a shallow radial layer in said part beneath said outer part surface while wet resin-impregnated reinforcing fibers are being wound on said outer part surface.

2. A filament winding process as defined in claim 1, further comprising:
   heating said part to a predetermined winding temperature during winding of said wet resin-impregnated fibers on said part to facilitate gelling of said resin.

3. A filament winding process as defined in claim 2 wherein:
   heat is applied to the part through radiation from an infrared heater aimed at said part while said part is being wound.

4. A filament winding process as defined in claim 2 wherein:
   heat is applied to the part through conduction from internally heated mandrel.

5. A filament winding process as defined in claim 2 wherein:
   heat is applied to the part through radiation, convection or conduction to elevate the temperature of said part to a set temperature of about 55° C.–100° C.

6. A filament winding process as defined in claim 5, further comprising:
   maintaining said part, mandrel or surrounding air temperature around said part at said set temperature using one or more process controllers.

7. A filament winding process as defined in claim 5, wherein:
   controlling said application of heat to said part to maintain said part at a set level by temperature measurement using infrared sensors aimed at said part.

8. A filament winding process as defined in claim 5, further comprising:

continuing to apply heat and rotate said part for about one hour after completing winding of said fiber on said part to finish gelling resin on said part.

9. A filament winding process as defined in claim 5 wherein:

said resin has a gelation time of less between 50 and 70 minutes at the winding temperature.

10. A filament winding process as defined in claim 1 wherein:

said fibers are in the form of fiber tows;

heating said resin in a bath to an elevated temperature sufficient to reduce viscosity of said resin to a viscosity below about 300 cps;

said resin impregnating step includes passing said fiber tows through said resin bath where the amount of resin is less than less than 0.15 liters/tow, and then removing excess resin to produce said resin-impregnated fiber tow having a volume of resin between 0.4 and 0.5.

11. A filament winding process as defined in claim 10, further comprising:

said resin impregnating step includes passing said fiber tows under a non-rotating bath spindle beneath the resin level in said resin bath; and removing said non-rotating bath spindle for changing tows.

12. A filament winding process as defined in claim 10, further comprising:

maintaining a mixture ratio between resin and hardener and resin level in said bath with a resin level sensor and an automatic meter-mixing pump.

13. A filament winding process as defined in claim 12, wherein:

resin and hardener is pumped from two or more connected containers of each component.

14. A filament winding process as defined in claim 1 wherein:

said fibers are wound simultaneously in multiple tows.

15. A filament winding process as defined in claim 1, wherein:

said fibers are wound simultaneously in a commingled mixture of more than one type of fiber.

16. A filament winding process as defined in claim 1 wherein:

replacing sets of fiber tows quickly by using replaceable pre-strung fiber combs or orifice holders.

17. A filament winding process as defined in claim 16, further comprising:

passing said fiber through fiber spaces closed on four sides in said replaceable pre-strung fiber combs at the entrance to said resin bath to maintain a desired fiber tow spacing.

18. A filament winding process as defined in claim 1, wherein:

cleaning and preventing fiber windup on rotating rollers in the fiber path using scrapers in contact with said rollers.

19. A filament winding process as defined in claim 1, further comprising:

removing fiber fuzz balls before they can be wound into the parts using a vacuum nozzle placed along the fiber path.

20. A process for manufacturing composite flywheel rims, comprising:

impregnating fibers with a resin;

winding said resin-impregnated fibers on an elongated mandrel to produce an elongated cylindrical log having an outer log surface;

curing said resin; and thereafter cutting individual rims from said log.

21. A process as defined in claim 20, further comprising:

gelling said resin in a shallow radial layer in said log beneath said outer log surface while wet resin-impregnated reinforcing fibers are being wound on said outer log surface.

22. A process as defined in claim 20, further comprising:

machining said individual rims to final dimensions by grinding.

23. A filament winding process as defined in claim 22 wherein:

said flywheel rims are machined to final dimensions using a diamond grinding wheel.

24. A filament winding process as defined in claim 20 wherein:

the flywheel rims cut from the log are coated with epoxy to seal the composite after machining.

25. A composite flywheel rim, comprising:

an annular structure having a radial wall thickness greater than 1", a void content of less than 2%, and a fiber volume fraction greater than 60%.

26. A composite flywheel rim as defined claim 25 made by the process defined by claim 1.

27. A composite flywheel rim as defined claim 25 made by the process defined by claim 20.

28. A composite flywheel rim as defined claim 25, comprising:

carbon fiber and/or glass fiber in a matrix of thermoset resin.

29. A composite flywheel rim as defined claim 25, wherein:

all fiber axes are aligned at more than an angle against longitudinal axis of the rim, wherein $\Theta$ is between 80° and 90°.

30. A composite flywheel rim as defined claim 25, wherein:

said fibers are wound in rings of different types of fiber; and the tensile modulus in the circumferential direction in outer section is equal to or more than that of inner section.

31. An apparatus for hoop-winding a fiber-wound composite flywheel rim comprising an elongated mandrel having a central axis and a motor for rotating said mandrel about said axis at a desired speed of rotation;

a creel mounted opposite said mandrel, said creel having a plurality of removable fiber spools for supplying a set of fibers to be wound on said mandrel;

a low-volume resin bath interposed between said creel and said mandrel, said bath having a heater for impregnating said fibers from said creel with heated, low-viscosity resin before said set of fibers is wound on said mandrel;

a resin metering and mixing apparatus for supplying mixed resin and hardener to said bath to maintain a supply of resin in said bath at a predetermined level;

a fiber pay-out unit for feeding said fiber set impregnated with resin from said resin bath to said mandrel in a controlled manner while said mandrel rotates; and a heater for heating said resin on said mandrel to accelerate gelling time for said resin;

whereby said resin gells in a shallow radial layer near outer circumference portions of said rim while said winding proceeds.

32. An apparatus as defined in claim 31, further comprising a fiber stringing set for maintaining a desired separation between fibers in said resin bath, said fiber stringing set including:

a first lead-in comb at a first edge of said bath where said fiber set first enters said bath; and an orifice holder at a second edge of said resin bath opposite said first edge, said orifice holder having a plurality of orifices through which individual fiber tows are strung for controlling the amount of resin on said fiber tows before winding onto said mandrel.

33. An apparatus as defined in claim 32, further comprising:

a quick-change system for changing from a first fiber set to a second fiber set to be wound on said mandrel, said quick-change system including a separate set of fiber spools and a separate fiber stringing set;

whereby, a second fiber set on said separate set of fiber spools can be prestrung on said separate fiber stringing set for rapid change from said first fiber set to said second fiber set.

34. An apparatus as defined in claim 33, wherein:

said fiber pay-out system has a braked roller for applying tension of a predetermined magnitude to said fibers, and a second roller having a load cell for measuring said tension;

cantilever supports for mounting said braked roller and said second roller from one end only, whereby said second fiber set can be quickly routed between said rollers.

35. An apparatus as defined in claim 31, wherein:

said fiber pay-out system has a braked roller for applying a predetermined tension to said fibers and a second roller having a load cell for measuring said tension.

36. An apparatus as defined in claim 31, further comprising:

a traversing mechanism for traversing said fiber pay-out system parallel to said axis to feed said fiber set onto said mandrel at a predetermined angle relative to said axis.

* * * * *